US008418315B1

(12) United States Patent
Lin et al.

(10) Patent No.: US 8,418,315 B1
(45) Date of Patent: Apr. 16, 2013

(54) COMBINATION CASTOR BRAKE SYSTEM WHOSE CASTOR ASSEMBLIES ARE BRAKED AND POSITIONED SIMULTANEOUSLY

(75) Inventors: Ming-Hsien Lin, Yongkang (TW); Feng-Hsi Yang, Tainan (TW)

(73) Assignee: Sunny Castors Co., Ltd., Tainan Hsien (TW)

( * ) Notice: Subject to any disclaimer, the term of this patent is extended or adjusted under 35 U.S.C. 154(b) by 0 days.

(21) Appl. No.: 13/347,807

(22) Filed: Jan. 11, 2012

(51) Int. Cl.
*B60B 33/00* (2006.01)

(52) U.S. Cl.
USPC .................. 16/35 R; 16/35 D; 188/29; 188/31

(58) Field of Classification Search .................. 16/35 R, 16/35 D, 39, 31 R; 5/86.1; 188/19, 20, 229, 188/30, 31, 68, 69; 280/47.34, 47.38, 33.994
See application file for complete search history.

(56) References Cited

U.S. PATENT DOCUMENTS

| | | | | | |
|---|---|---|---|---|---|
| 3,881,216 | A | * | 5/1975 | Fontana | 16/35 R |
| 3,949,444 | A | * | 4/1976 | Mattinson | 16/35 R |
| 4,677,706 | A | * | 7/1987 | Screen | 16/35 R |
| 5,012,550 | A | * | 5/1991 | Schlosser | 16/35 R |
| 5,232,071 | A | * | 8/1993 | Kawanabe | 188/1.12 |
| 5,450,639 | A | * | 9/1995 | Weismiller et al. | 5/600 |
| 5,457,849 | A | * | 10/1995 | Branson et al. | 16/19 |
| 5,675,864 | A | * | 10/1997 | Chou | 16/35 R |
| 5,737,801 | A | * | 4/1998 | Flood | 16/30 |
| 5,765,665 | A | * | 6/1998 | Cheng et al. | 188/20 |
| 5,774,936 | A | * | 7/1998 | Vetter | 16/35 R |
| 6,102,167 | A | * | 8/2000 | Chiu | 188/20 |
| 6,170,837 | B1 | * | 1/2001 | Ross | 280/1 |
| 6,240,579 | B1 | * | 6/2001 | Hanson et al. | 5/86.1 |
| 6,264,006 | B1 | * | 7/2001 | Hanson et al. | 188/1.12 |
| 6,286,184 | B1 | * | 9/2001 | Dean et al. | 16/35 R |
| 6,298,950 | B1 | * | 10/2001 | Oelrichs et al. | 188/20 |
| 6,308,805 | B1 | * | 10/2001 | Lan | 188/20 |
| 6,360,851 | B1 | * | 3/2002 | Yang | 188/1.12 |
| 6,460,205 | B1 | * | 10/2002 | Lewandowski et al. | 5/600 |
| 6,478,312 | B1 | * | 11/2002 | Petrucci et al. | 280/11.211 |
| 6,484,359 | B1 | * | 11/2002 | Guttmann et al. | 16/18 R |
| 6,575,052 | B2 | * | 6/2003 | Toennesland et al. | 74/512 |
| 6,584,641 | B1 | * | 7/2003 | Milbredt | 16/35 R |
| 6,834,746 | B1 | * | 12/2004 | Lin | 188/1.12 |
| 6,854,568 | B2 | * | 2/2005 | Kun-Tsai | 188/1.12 |
| 6,951,034 | B2 | * | 10/2005 | Shiery et al. | 5/86.1 |
| 7,182,178 | B2 | * | 2/2007 | Chung | 188/1.12 |
| 7,346,942 | B2 | * | 3/2008 | Reinke et al. | 5/86.1 |
| 7,480,948 | B2 | * | 1/2009 | Reinke et al. | 5/86.1 |
| 7,516,512 | B2 | * | 4/2009 | Tsai | 16/35 R |

(Continued)

*Primary Examiner* — Victor Batson
*Assistant Examiner* — Jason W San
(74) *Attorney, Agent, or Firm* — Alan Kamrath; Kamrath IP Lawfirm, P.A.

(57) ABSTRACT

A combination castor brake system includes a linking device, and a plurality of castor assemblies connected with the linking device. Each of the castor assemblies includes an operation unit, a braking unit connected with the operation unit, and at least one roller connected with the braking unit. The operation unit of each of the castor assemblies includes a mounting seat, a slide, and at least two limit rods. The braking unit of each of the castor assemblies includes a housing, a top cap, a control shaft, an elastic member, and a braking member. The roller of each of the castor assemblies is rotatably mounted on the housing of the braking unit. Thus, the linking device can drive and operate the castor assemblies to brake and position the castor assemblies simultaneously.

6 Claims, 9 Drawing Sheets

U.S. PATENT DOCUMENTS

| | | | |
|---|---|---|---|
| 7,546,908 B2 * | 6/2009 | Chang | 188/1.12 |
| 7,559,098 B2 * | 7/2009 | He | 5/81.1 R |
| 7,698,760 B2 * | 4/2010 | Reckelhoff et al. | 5/600 |
| 7,698,780 B2 * | 4/2010 | Yan | 16/35 R |
| 7,810,613 B2 * | 10/2010 | Lin | 188/1.12 |
| 7,810,822 B2 * | 10/2010 | Figel et al. | 280/47.38 |
| 7,861,370 B2 * | 1/2011 | Chu | 16/35 R |
| 7,891,051 B2 * | 2/2011 | Chou | 16/35 R |
| 7,922,183 B2 * | 4/2011 | Figel et al. | 280/47.38 |
| 7,926,145 B2 * | 4/2011 | Liao | 16/35 R |
| 7,930,802 B2 * | 4/2011 | Tsai | 16/35 R |
| 7,950,108 B2 * | 5/2011 | Yang et al. | 16/47 |
| 7,987,553 B2 * | 8/2011 | Lin | 16/35 R |
| 7,992,254 B2 * | 8/2011 | Ahn et al. | 16/35 R |
| 8,016,301 B2 * | 9/2011 | Figel et al. | 280/47.38 |
| 8,024,101 B2 * | 9/2011 | Froli | 701/70 |
| 8,079,606 B2 * | 12/2011 | Dull et al. | 280/47.39 |
| 8,146,203 B2 * | 4/2012 | Pollard | 16/18 R |
| 8,167,095 B2 * | 5/2012 | Sonnendorfer et al. | 188/19 |
| 8,201,667 B2 * | 6/2012 | Chen et al. | 188/20 |
| 8,205,297 B2 * | 6/2012 | Fallshaw et al. | 16/35 R |
| 8,220,110 B1 * | 7/2012 | Chen | 16/35 R |
| 8,267,226 B2 * | 9/2012 | Gray | 188/1.12 |
| 8,292,327 B2 * | 10/2012 | Araya Moreno et al. | 280/771 |
| 8,302,257 B2 * | 11/2012 | Lin | 16/35 R |
| 2002/0033307 A1 * | 3/2002 | Mobley et al. | 188/1.12 |
| 2003/0066716 A1 * | 4/2003 | Liu | 188/19 |
| 2011/0120815 A1 * | 5/2011 | Frolik et al. | 188/1.12 |
| 2011/0225733 A1 * | 9/2011 | Figel et al. | 5/611 |
| 2012/0031714 A1 * | 2/2012 | Chen et al. | 188/69 |
| 2012/0085595 A1 * | 4/2012 | Chen et al. | 188/1.12 |
| 2012/0174319 A1 * | 7/2012 | Menkedick et al. | 5/618 |
| 2012/0199423 A1 * | 8/2012 | Heidlage et al. | 188/1.12 |
| 2012/0255141 A1 * | 10/2012 | Lin et al. | 16/45 |

* cited by examiner

COMBINATION CASTOR BRAKE SYSTEM WHOSE CASTOR ASSEMBLIES ARE BRAKED AND POSITIONED SIMULTANEOUSLY

BACKGROUND OF THE INVENTION

1. Field of the Invention

The present invention relates to a wheeled vehicle and, more particularly, to a combination castor brake system for a cart, stroller, chair, wheelchair, patient bed, shelf, cabinet and the like.

2. Description of the Related Art

A conventional wheeled vehicle, such as a cart, stroller, chair and the like, comprises a main frame, a plurality of castors mounted on the bottom of the main frame, and a plurality of braking devices mounted on a respective one of the castors to brake and position each of the castors. However, the castors are controlled by the braking devices respectively so that a user has to lock each of the braking devices respectively so as to brake and position each of the castors and has to unlock each of the braking devices respectively so as to release each of the castors, thereby greatly causing inconvenience to the user when locking and unlocking the castors.

BRIEF SUMMARY OF THE INVENTION

In accordance with the present invention, there is provided a combination castor brake system, comprising a linking device, and a plurality of castor assemblies connected with the linking device. Each of the castor assemblies comprises an operation unit, a braking unit connected with the operation unit, and at least one roller connected with the braking unit. The operation unit of each of the castor assemblies includes a mounting seat having an interior provided with a slideway, a slide slidably mounted in the slideway of the mounting seat and having a first end provided with a connecting portion pivotally connected with the linking device and a second end provided with a pressing ramp, and at least two limit rods each extended through the mounting seat and the slide. The mounting seat of the operation unit has two opposite sidewalls each provided with at least two through holes to allow passage of the limit rods. The slide of the operation unit has two opposite sidewalls each provided with at least two elongate limit slots slidable on the limit rods. The limit rods of the operation unit in turn extend through the through holes of the mounting seat and the limit slots of the slide. The connecting portion of the slide is driven by the linking device so that the slide of the operation unit is movable in concert with the linking device. The braking unit of each of the castor assemblies includes a housing rotatably mounted on the mounting seat of the operation unit, a top cap mounted on the mounting seat of the operation unit, a control shaft movably mounted in the housing and having an upper end provided with a head pressing the pressing ramp of the slide and a lower end extended into the housing, an elastic member mounted on the control shaft and biased between the mounting seat of the operation unit and the control shaft, and a braking member secured on the lower end of the control shaft to move in concert with the control shaft and having a bottom provided with a braking portion that is movable to engage the roller. The braking member of the braking unit is received in the housing. The roller of each of the castor assemblies is rotatably mounted on the housing of the braking unit and is disposed under the braking portion of the braking member.

The primary objective of the present invention is to provide a combination castor brake system whose castor assemblies are braked and positioned simultaneously.

According to the primary advantage of the present invention, the linking device can drive and operate the castor assemblies so as to brake and position the castor assemblies simultaneously, thereby facilitating a user operating the castor assemblies.

According to another advantage of the present invention, the user only needs to drive the linking device so as to operate the castor assemblies simultaneously so that the user can control the castor assemblies easily and quickly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
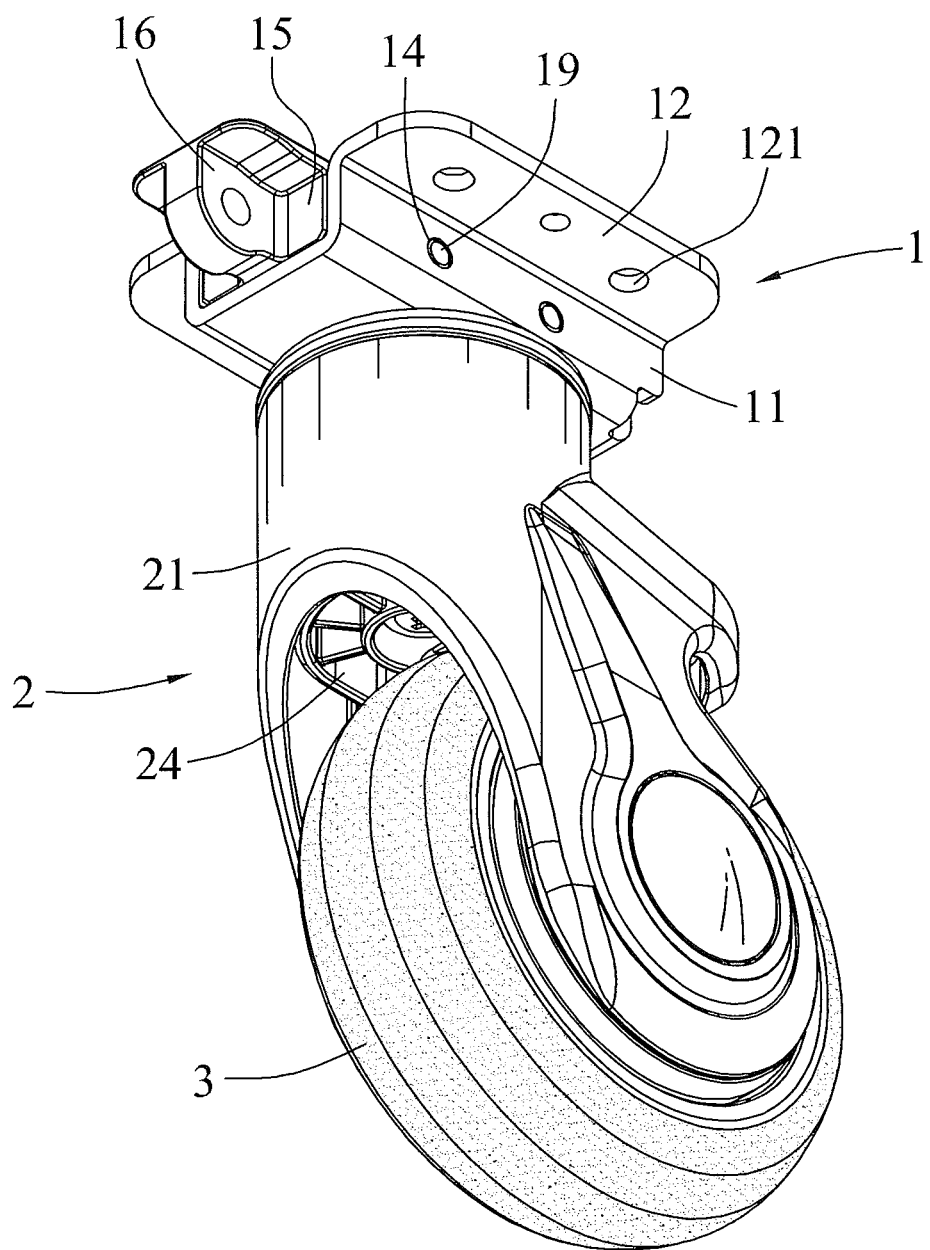
FIG. 1 is a partially perspective view of a combination castor brake system in accordance with the preferred embodiment of the present invention.

Referring to the drawings and initially to FIGS. 1-5, a combination castor brake system in accordance with the preferred embodiment of the present invention comprises a linking device 4, and a plurality of castor assemblies connected with the linking device 4.

Each of the castor brake system assemblies comprises an operation unit 1, a braking unit 2 connected with the operation unit 1, and at least one roller 3 connected with the braking unit 2.

The operation unit 1 of each of the castor assemblies includes a mounting seat 11 having an interior provided with a slideway 13, a slide 15 slidably mounted in the slideway 13 of the mounting seat 11 and having a first end provided with a connecting portion 16 pivotally connected with the linking device 4 and a second end provided with a pressing ramp 17, and at least two limit rods 19 each extended through the mounting seat 11 and the slide 15.

The mounting seat 11 of the operation unit 1 is attached to the bottom of an object, such as a cart, stroller, chair and the like. The mounting seat 11 of the operation unit 1 has a substantially U-shaped profile and has two opposite sidewalls each provided with at least two through holes 14 to allow passage of the limit rods 19. Each of the two opposite sidewalls of the mounting seat 11 has a top provided with a protruded fixing ear 12 which has a plurality of fixing holes 121 for affixing the mounting seat 11 of the operation unit 1 to the bottom of the object.

The slide 15 of the operation unit 1 is disposed above the mounting seat 11 of the operation unit 1. The slide 15 of the operation unit 1 has two opposite sidewalls each provided with at least two elongate limit slots 18 slidable on the limit rods 19. The connecting portion 16 of the slide 15 is driven by the linking device 4 so that the slide 15 of the operation unit 1 is movable in concert with the linking device 4. The limit slots 18 of the slide 15 are aligned with and connected to the through holes 14 of the mounting seat 11.

The pressing ramp 17 of the slide 15 is disposed above and connected to the slideway 13 of the mounting seat 11. The pressing ramp 17 of the slide 15 is inclined with a determined angle so that the slide 15 of the operation unit 1 has a thinner first side and a thicker second side. The limit rods 19 of the operation unit 1 in turn extend through the through holes 14 of the mounting seat 11 and the limit slots 18 of the slide 15.

The braking unit 2 of each of the castor assemblies includes a housing 21 rotatably mounted on the mounting seat 11 of the operation unit 1, a top cap 22 mounted on the mounting seat 11 of the operation unit 1, a control shaft 23 movably mounted in the housing 21 and having an upper end provided with a head 231 pressing the pressing ramp 17 of the slide 15 and a lower end extended into the housing 21, an elastic member 232 mounted on the control shaft 23 and biased between the mounting seat 11 of the operation unit 1 and the control shaft 23, and a braking member 24 secured on the lower end of the control shaft 23 to move in concert with the control shaft 23 and having a bottom provided with a braking portion 25 that is movable to engage the roller 3.

The top cap 22 of the braking unit 2 has a disk shape and is disposed above the housing 21. The elastic member 232 of the braking unit 2 is received in the slideway 13 of the mounting seat 11 and has an upper end abutting the head 231 of the control shaft 23 and lower end abutting the mounting seat 11 of the operation unit 1.

The control shaft 23 of the braking unit 2 is in turn extended through the mounting seat 11 of the operation unit 1 into the housing 21. The control shaft 23 of the braking unit 2 is movable in the slide 15 and movable in the slideway 13 of the mounting seat 11. The head 231 of the control shaft 23 has an arcuate shape and is disposed between the pressing ramp 17 of the slide 15 and the elastic member 232. The head 231 of the control shaft 23 is pushed by the elastic member 232 and is movable toward the pressing ramp 17 of the slide 15.

The braking member 24 of the braking unit 2 is received in the housing 21. The braking member 24 of the braking unit 2 has a side provided with a chamber 26 which has a top wall provided with a first positioning toothed portion 27.

The braking unit 2 of each of the castor assemblies further includes a positioning member 28 mounted on the mounting seat 11 of the operation unit 1 and having a periphery provided with a second positioning toothed portion 29. The positioning member 28 of the braking unit 2 is received in the housing 21. The second positioning toothed portion 29 of the positioning member 28 is disposed under the first positioning toothed portion 27 of the braking member 24, and the first positioning toothed portion 27 of the braking member 24 is movable to engage the second positioning toothed portion 29 of the positioning member 28 when the braking member 24 of the braking unit 2 is moved downward in concert with the control shaft 23.

The roller 3 of each of the castor assemblies is rotatably mounted on the housing 21 of the braking unit 2 and is disposed under the braking portion 25 of the braking member 24.

Figure 2:
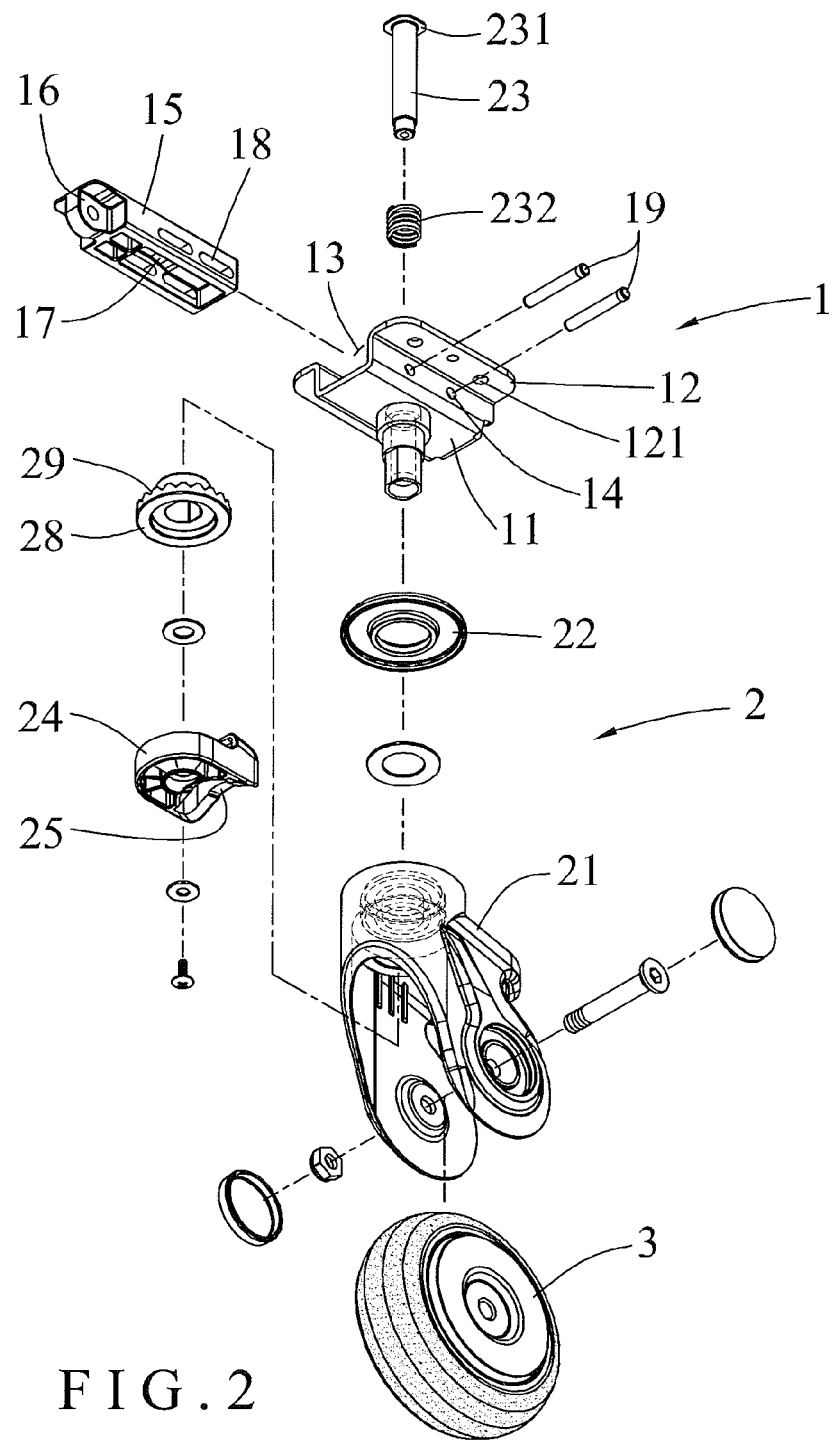
FIG. 2 is an exploded perspective view of the combination castor brake system as shown in FIG. 1.
Figure 3:
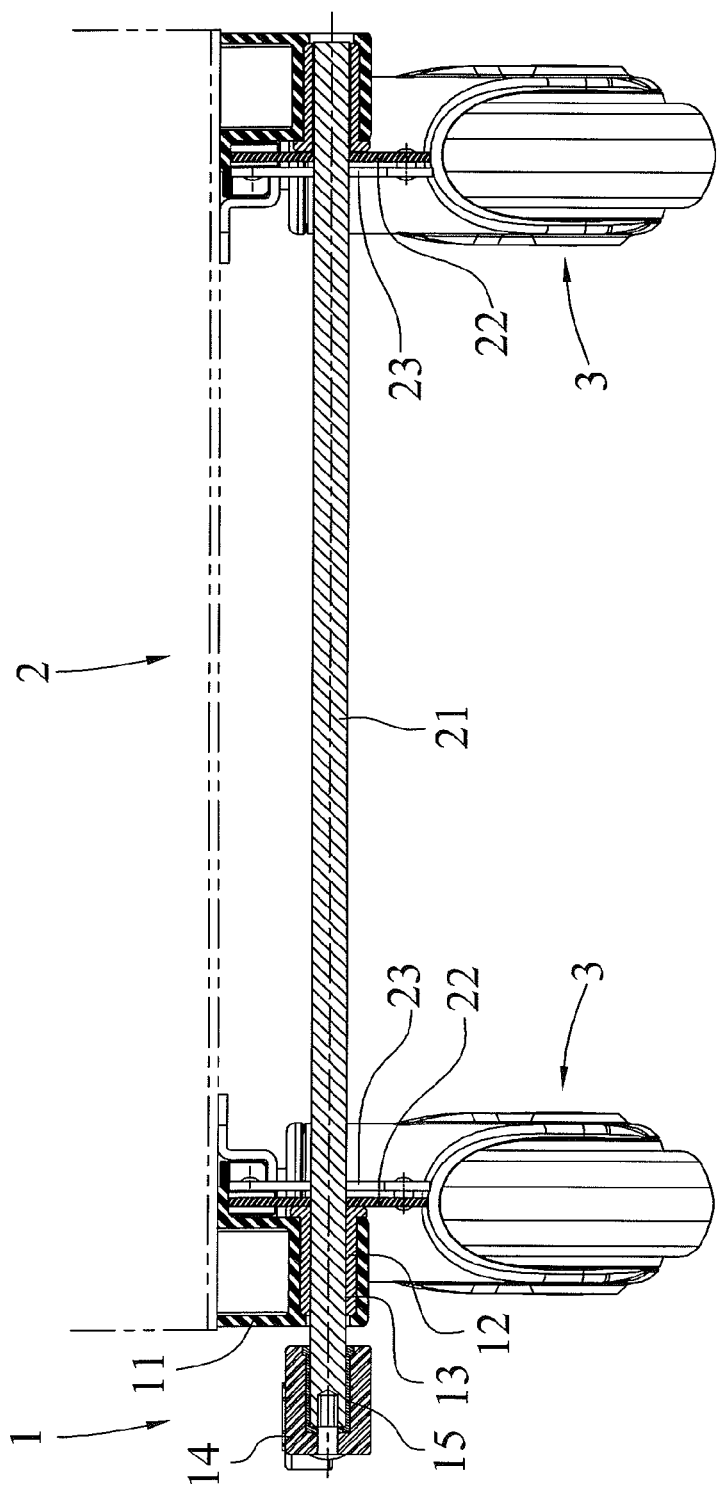
FIG. 3 is a perspective view of a braking member of the combination castor brake system as shown in FIG. 1.
Figure 4:
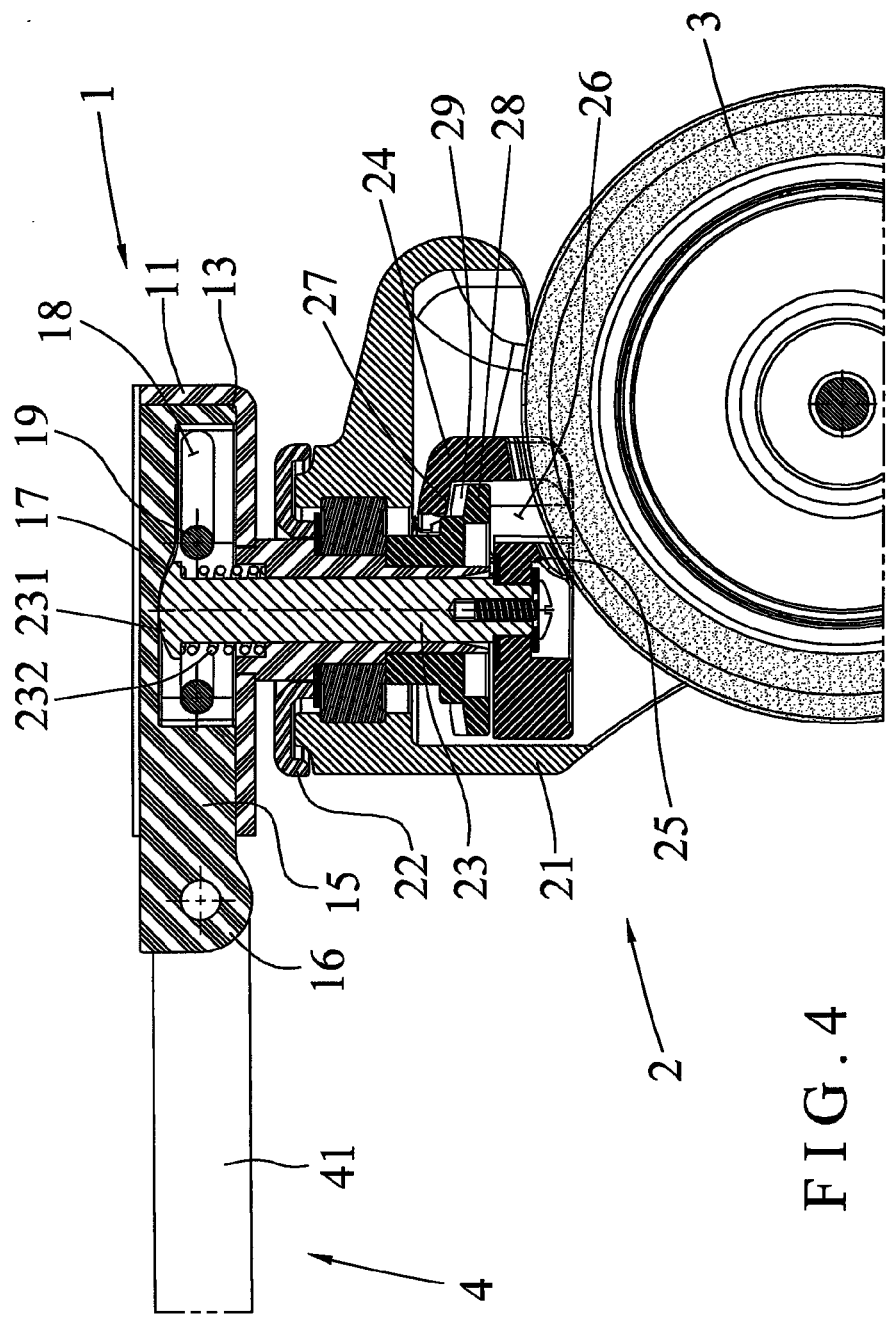
FIG. 4 is a side cross-sectional view of the combination castor brake system as shown in FIG. 1.
Figure 5:
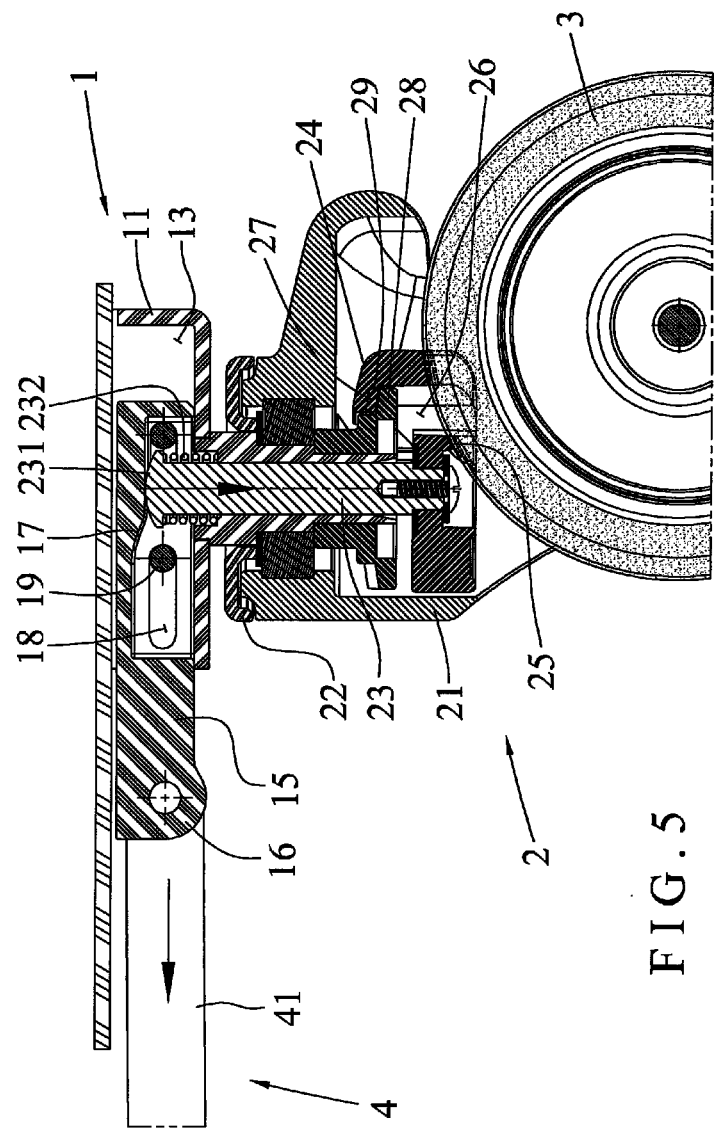
FIG. 5 is a schematic operational view of the combination castor brake system as shown in FIG. 4.

In operation, referring to FIGS. 4 and 5 with reference to FIGS. 1-3, when the connecting portion 16 of the slide 15 of each of the castor assemblies is pulled by the linking device 4, the slide 15 of each of the castor assemblies is moved to displace the pressing ramp 17 which presses the head 231 of the control shaft 23 so as to move the control shaft 23 downward and to compress the elastic member 232 so that the braking member 24 is moved downward by the control shaft 23, and the braking portion 25 of the braking member 24 is moved downward to engage the rim of the roller 3 so as to brake the roller 3. At the same time, the first positioning toothed portion 27 of the braking member 24 is moved downward to engage the second positioning toothed portion 29 of the positioning member 28 when the braking member 24 of the braking unit 2 is moved downward by the control shaft 23 so as to locate the housing 21 and to position the roller 3 in place.

On the contrary, when the connecting portion 16 of the slide 15 of each of the castor assemblies is pushed backward by the linking device 4, the slide 15 of each of the castor assemblies is moved backward to displace the pressing ramp 17 so that the pressing ramp 17 is moved and returned to the original position to release the control shaft 23. In such a manner, the control shaft 23 is pushed upward by the restoring force of the elastic member 232, so that the braking member 24 is moved upward by the control shaft 23, and the braking portion 25 of the braking member 24 is moved upward to detach from the rim of the roller 3 so as to unlock the roller 3. Thus, the roller 3 can be rolled relative to the housing 21 freely. At the same time, the first positioning toothed portion 27 of the braking member 24 is moved upward to detach from the second positioning toothed portion 29 of the positioning member 28 when the braking member 24 of the braking unit 2 is moved upward by the control shaft 23 so as to unlock the housing 21 so that the housing 21 can be swiveled relative to the mounting seat 11 of the operation unit 1 freely.

Figure 6:
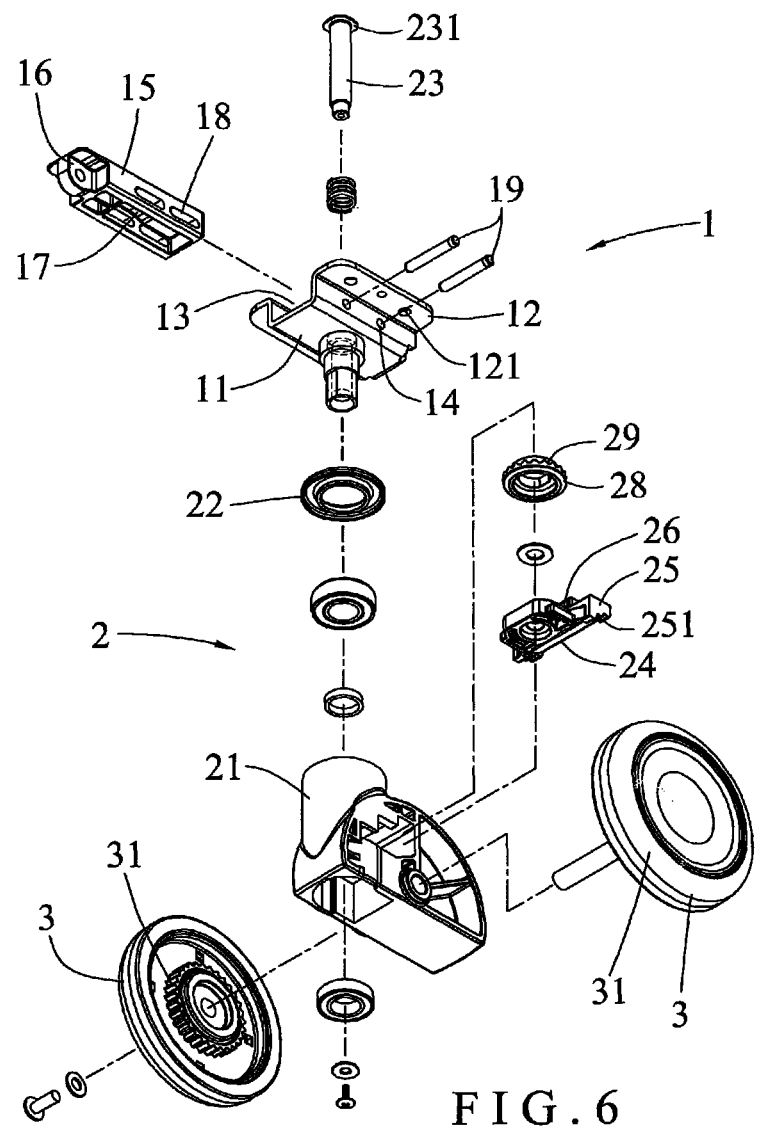
FIG. 6 is a partially exploded perspective view of a combination castor brake system in accordance with another preferred embodiment of the present invention.
Figure 7:
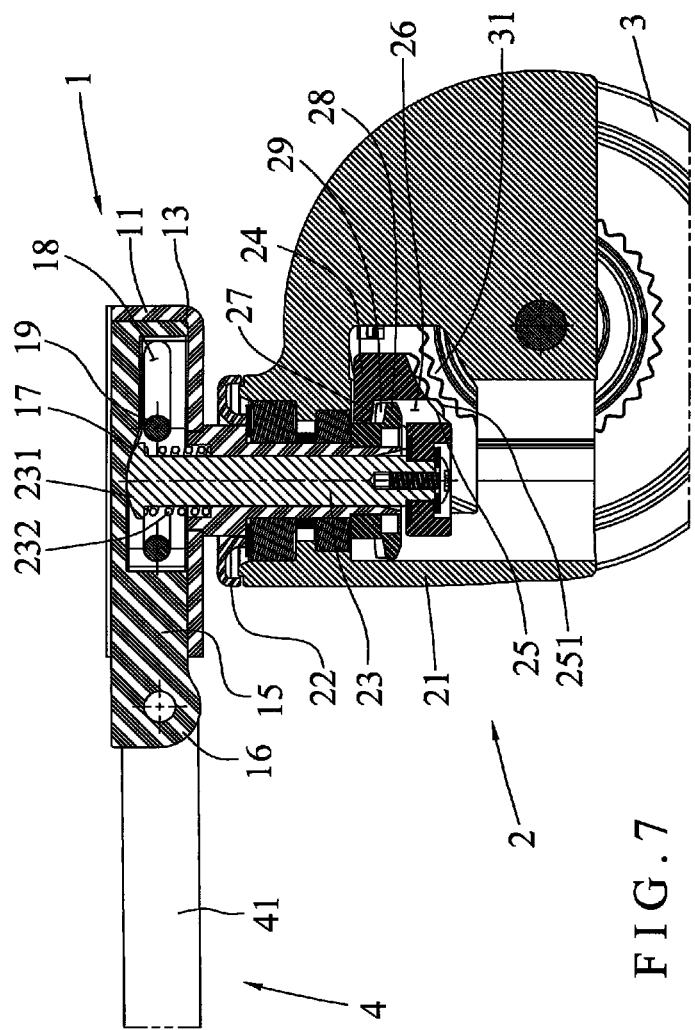
FIG. 7 is a side cross-sectional assembly view of the combination castor brake system as shown in FIG. 6.
Figure 8:
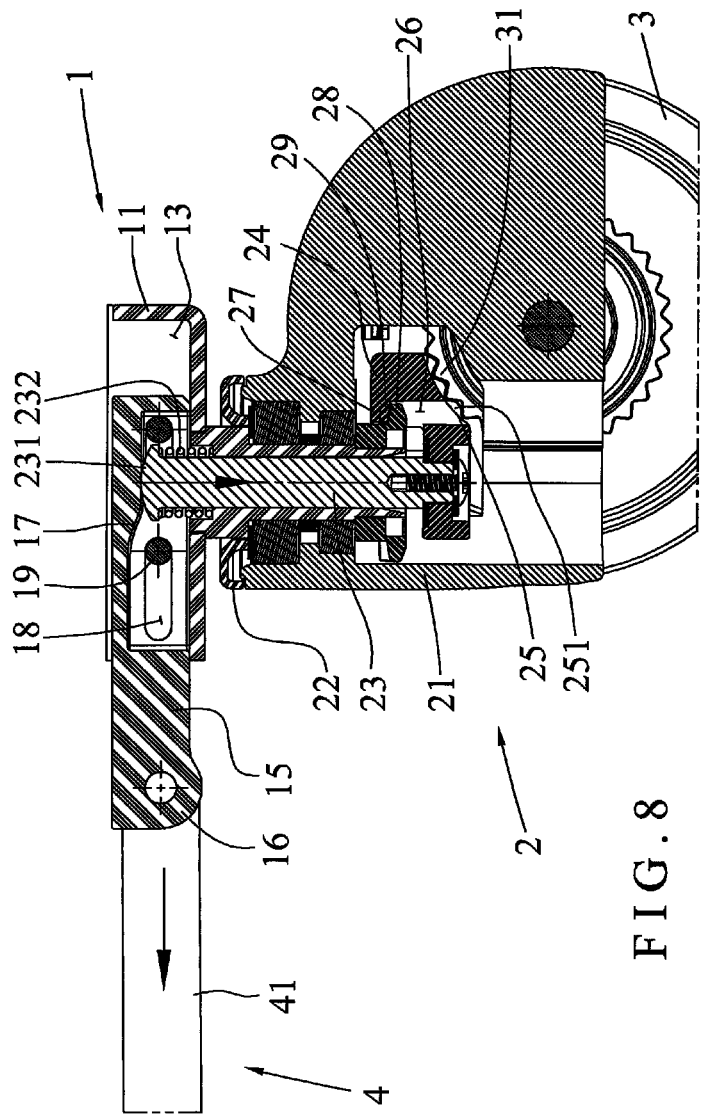
FIG. 8 is a schematic operational view of the combination castor brake system as shown in FIG. 7.

Referring to FIGS. 6-8 with reference to FIGS. 1-5, each of the castor assemblies comprises two rollers 3 connected with the braking unit 2. The rollers 3 of each of the castor assemblies are rotatably mounted on two opposite sides of the housing 21. Each of the rollers 3 has an inner periphery provided with a plurality of first locking teeth 31 which are arranged in an annular manner. The braking portion 25 of the braking member 24 has two opposite sides each provided with a plurality of second locking teeth 251 which are movable downward to engage the first locking teeth 31 of a respective one of the rollers 3. Thus, when the braking member 24 is moved downward by the control shaft 23, the second locking teeth 251 of the braking portion 25 of the braking member 24 are moved downward to engage the first locking teeth 31 of each of the rollers 3 so as to brake each of the rollers 3.

Figure 9:
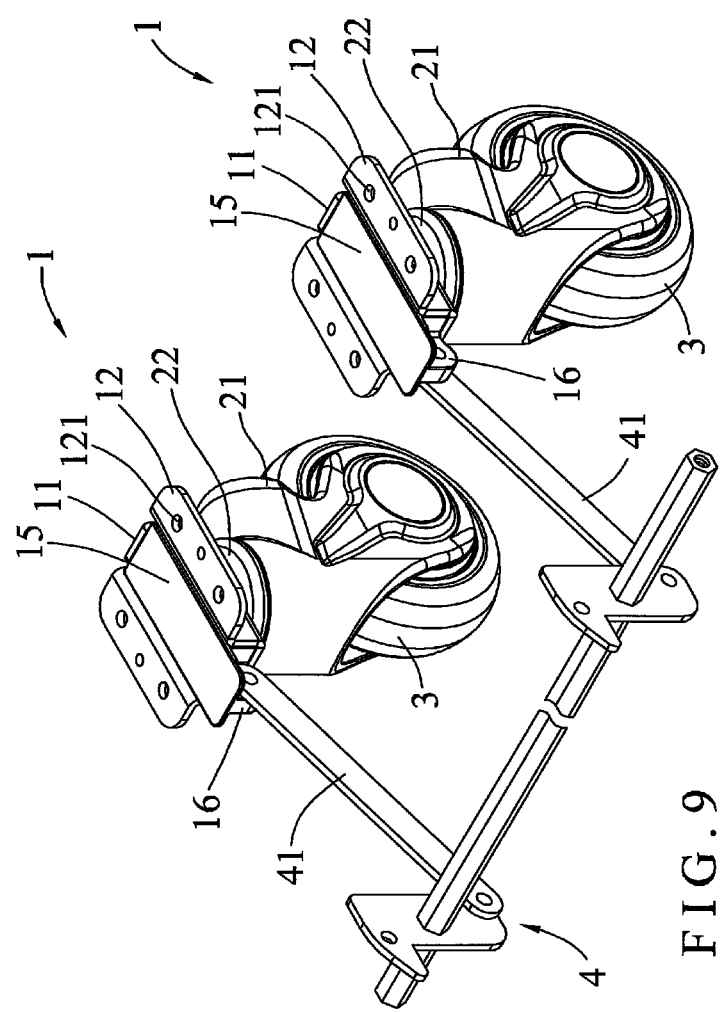
FIG. 9 is a perspective view of a combination castor brake system in accordance with another preferred embodiment of the present invention.

Referring to FIG. 9 with reference to FIGS. 1-5, the linking device 4 includes a plurality of links 41 each having an end pivotally connected with the connecting portion 16 of the slide 15 of a respective one of the castor assemblies. Thus, the linking device 4 drives the castor assemblies simultaneously.

Accordingly, the linking device 4 can drive and operate the castor assemblies so as to brake and position the castor assemblies simultaneously, thereby facilitating a user operating the castor assemblies. In addition, the user only needs to drive the linking device 4 so as to operate the castor assemblies simultaneously so that the user can control the castor assemblies easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A combination castor brake system, comprising:
   a linking device; and
   a plurality of castor assemblies connected with the linking device;
   wherein each of the castor assemblies comprises:
   an operation unit;
   a braking unit connected with the operation unit;
   and at least one roller connected with the braking unit;
   the operation unit of each of the castor assemblies includes:
   a mounting seat having an interior provided with a slideway;
   a slide slidably mounted in the slideway of the mounting seat and having a first end provided with a connecting portion pivotally connected with the linking device and a second end provided with a pressing ramp; and
   at least two limit rods each extended through the mounting seat and the slide;
   the mounting seat of the operation unit has two opposite sidewalls each provided with at least two through holes to allow passage of the limit rods;
   the slide of the operation unit has two opposite sidewalls each provided with at least two elongate limit slots slidable on the limit rods;
   the limit rods of the operation unit in turn extend through the through holes of the mounting seat and the limit slots of the slide;
   the connecting portion of the slide is driven by the linking device so that the slide of the operation unit is movable in concert with the linking device;
   the braking unit of each of the castor assemblies includes:
   a housing rotatably mounted on the mounting seat of the operation unit;
   a top cap mounted on the mounting seat of the operation unit;
   a control shaft movably mounted in the housing and having an upper end provided with a head pressing the pressing ramp of the slide and a lower end extended into the housing;
   an elastic member mounted on the control shaft and biased between the mounting seat of the operation unit and the control shaft; and
   a braking member secured on the lower end of the control shaft to move in concert with the control shaft and having a bottom provided with a braking portion that is movable to engage the roller;
   the braking member of the braking unit is received in the housing;
   the roller of each of the castor assemblies is rotatably mounted on the housing of the braking unit and is disposed under the braking portion of the braking member.

2. The combination castor of claim 1, wherein each of the two opposite sidewalls of the mounting seat has a top provided with a protruded fixing ear which has a plurality of fixing holes for affixing the mounting seat of the operation unit to a bottom of an object.

3. The combination castor of claim 1, wherein
   the head of the control shaft has an arcuate shape and is disposed between the pressing ramp of the slide and the elastic member;
   the head of the control shaft is pushed by the elastic member and is movable toward the pressing ramp of the slide.

4. The combination castor of claim 1, wherein
   the braking member of the braking unit has a side provided with a chamber which has a top wall provided with a first positioning toothed portion;
   the braking unit of each of the castor assemblies further includes a positioning member mounted on the mounting seat of the operation unit and having a periphery provided with a second positioning toothed portion;
   the positioning member of the braking unit is received in the housing;
   the second positioning toothed portion of the positioning member is disposed under the first positioning toothed portion of the braking member;
   the first positioning toothed portion of the braking member is movable to engage the second positioning toothed portion of the positioning member when the braking member of the braking unit is moved downward in concert with the control shaft.

5. The combination castor of claim 1, wherein
   each of the castor assemblies comprises two rollers connected with the braking unit;
   the rollers of each of the castor assemblies are rotatably mounted on two opposite sides of the housing;
   each of the rollers has an inner periphery provided with a plurality of first locking teeth;
   the braking portion of the braking member has two opposite sides each provided with a plurality of second locking teeth which are movable downward to engage the first locking teeth of a respective one of the rollers.

6. The combination castor of claim 1, wherein
   the slide of the operation unit is disposed above the mounting seat of the operation unit;
   the limit slots of the slide are aligned with and connected to the through holes of the mounting seat;
   the pressing ramp of the slide is disposed above and connected to the slideway of the mounting seat;
   the top cap of the braking unit is disposed above the housing;
   the elastic member of the braking unit is received in the slideway of the mounting seat and has an upper end abutting the head of the control shaft and lower end abutting the mounting seat of the operation unit;
   the control shaft of the braking unit is in turn extended through the mounting seat of the operation unit into the housing;
   the control shaft of the braking unit is movable in the slide and movable in the slideway of the mounting seat.

* * * * *